(12) United States Patent
Komiyama (10) Patent No.: US 11,822,023 B2
(45) Date of Patent: Nov. 21, 2023

(54) NAVIGATION INFORMATION DEVICE AND NAVIGATION INFORMATION PROCESSING METHOD

(71) Applicant: Furuno Electric Co., Ltd., Nishinomiya (JP)

(72) Inventor: Katsuhiro Komiyama, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 380 days.

(21) Appl. No.: 17/203,869

(22) Filed: Mar. 17, 2021

(65) Prior Publication Data

US 2021/0293943 A1    Sep. 23, 2021

(30) Foreign Application Priority Data

Mar. 17, 2020    (JP) .................... 2020-045938

(51) Int. Cl.
| | |
|---|---|
| *G01S 7/62* | (2006.01) |
| *G06T 11/60* | (2006.01) |
| *G01S 15/96* | (2006.01) |
| *G08B 21/18* | (2006.01) |

(52) U.S. Cl.
CPC .......... *G01S 7/6218* (2013.01); *G01S 7/6272* (2013.01); *G01S 7/6281* (2013.01); *G01S 15/96* (2013.01); *G06T 11/60* (2013.01); *G06T 2207/30204* (2013.01); *G08B 21/182* (2013.01)

(58) Field of Classification Search
CPC .... G01S 7/6218; G01S 7/6272; G01S 7/6281; G01S 15/86; G01S 15/89; G01S 15/96; G01S 13/937; G06T 11/60; G06T 2207/30204; G08B 21/182; B63B 49/00; G01C 21/203
See application file for complete search history.

(56) References Cited

U.S. PATENT DOCUMENTS

| | | | | |
|---|---|---|---|---|
| 2012/0274504 A1* | 11/2012 | Kubota | ...................... | G01S 7/22 |
| | | | | 345/592 |
| 2012/0274660 A1* | 11/2012 | Okuda | ...................... | G01S 7/04 |
| | | | | 345/629 |
| 2013/0076561 A1* | 3/2013 | Kubota | ................... | G01S 7/292 |
| | | | | 342/179 |

(Continued)

*Primary Examiner* — Orlando Bousono
(74) *Attorney, Agent, or Firm* — XSENSUS LLP (57) ABSTRACT

The purpose is to provide a navigation information device and a navigation information processing method capable of excellently grasping a surrounding situation of own ship and improving a visibility of a detection result by a sonar. The navigation information device is provided with a surrounding information generating module for generating surrounding information around the ship itself, a sonar information generating module for generating sonar information indicating the detection result by the sonar, and a display control module for performing control for enlarging one display area of a surrounding screen on which the surrounding information is displayed and a sonar screen on which the sonar information is displayed and reducing the other display area, as compared with corresponding display area before satisfying the predetermined condition, when the predetermined condition is satisfied.

20 Claims, 9 Drawing Sheets

(56) References Cited

U.S. PATENT DOCUMENTS

| | | | |
|---|---|---|---|
| 2013/0286022 A1* | 10/2013 | Kubota | G01S 7/10 |
| | | | 345/440 |
| 2017/0210449 A1* | 7/2017 | Frisbie | B63B 49/00 |
| 2017/0242113 A1 | 8/2017 | Lauenstein | |
| 2019/0353744 A1* | 11/2019 | Laster | G06F 3/0412 |

* cited by examiner

NAVIGATION INFORMATION DEVICE AND NAVIGATION INFORMATION PROCESSING METHOD

CROSS-REFERENCE TO RELATED APPLICATION

This application claims priority under 35 U.S.C. § 119 to Japanese Patent Application No. 2020-045938, which was filed on Mar. 17, 2020, the entire disclosure of which is hereby incorporated by reference.

BACKGROUND OF THE INVENTION

Technical Field

To provide a navigation information device and a navigation information processing method.

Description of the Related Art

Conventionally, a technique has been developed in which a detection result of a target such as a fish school by a sonar mounted on a ship is superimposed on a chart screen showing a surrounding situation of an own ship.

However, since an area to be detected by the sonar is, for example, an area having a radius of about 5 km around the ship itself, and the display area of the detection result by the sonar is small relative to an entire chart, the detection result is difficult to be confirmed on a display screen.

On the other hand, there is a problem that a chart of a wide area cannot be displayed on a screen in which the area to be detected by the sonar is largely displayed, and the surrounding situation of the own ship cannot be sufficiently grasped.

SUMMARY OF THE INVENTION

It is an object of a present invention to provide a navigation information device and a navigation information processing method which can grasp the surrounding situation of the own ship well and can improve the visibility of the detection result by the sonar.

A first aspect of the present invention relates to the navigation information device. The navigation information device according to the aspect includes processing circuitry configured to generate surrounding information about a surrounding of an own ship, generate sonar information indicating a detection result by a sonar, and when a predetermined condition is satisfied, control to enlarge a display area of one of a surrounding screen on which the surrounding information is displayed and a sonar screen on which the sonar information is displayed and to reduce another display area, as compared with before the predetermined condition is satisfied.

According to the navigation information device according to the aspect, by including two screens relating to ships of different scales on one display screen and displaying them in different sizes, each of the two screens is displayed in an appropriate size, and both surrounding information of a wide area around the ship and target of fish school or the like existing in an area near the ship can be grasped at one time on one display screen. Therefore, the surrounding situation of the own ship can be well grasped, and the visibility of the detection result by the sonar can be improved.

DETAILED DESCRIPTION OF THE EMBODIMENTS

Embodiments of the present invention will be described below with reference to the drawings. In the drawings, the same or corresponding portions are denoted by the same reference numerals, and the description thereof will not be repeated. At least some of the embodiments described below may be optionally combined.

Figure 1:
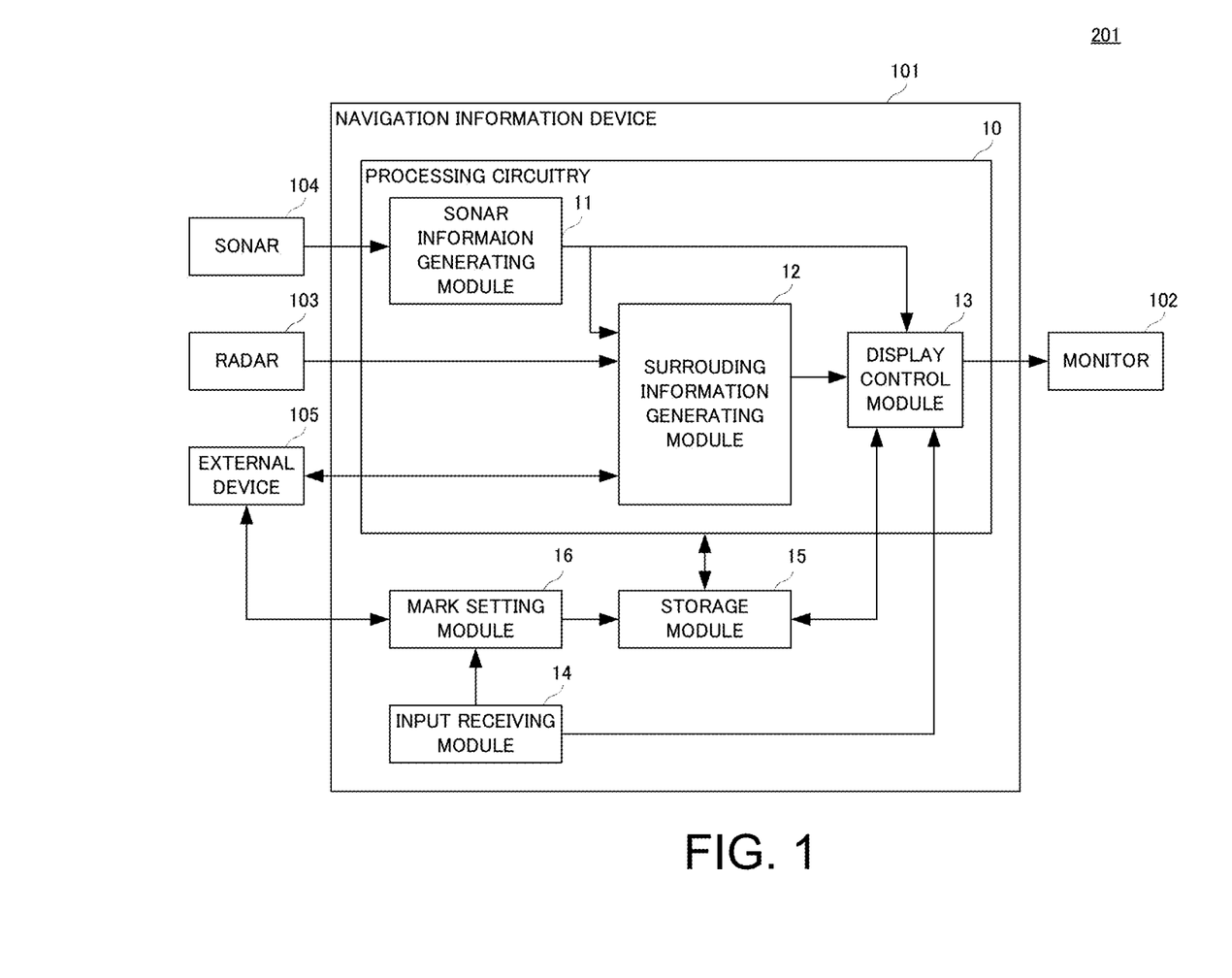
FIG. 1 shows a configuration of a navigation information system according to an embodiment of the present invention.

FIG. 1 shows a configuration of a navigation information system 201 according to the embodiment of the present invention.

Referring to FIG. 1, the navigation information system 201 includes a navigation information device 101, a monitor 102, a radar 103, a sonar 104, and an external device 105. The navigation information system 201 is mounted on a ship. Hereinafter, a ship equipped with the navigation information system 201 is also referred to as an "own ship".

The radar 103 transmits a radio wave, receives a reflected wave of the transmitted radio wave from a target, and detects the target, such as another ship or the like, existing around the own ship on the basis of the received reflected wave. Then, the radar 103 periodically or irregularly transmits radar detection information indicating a latest detection result to the navigation information device 101. The radar detection information indicates, for example, a detection target region R1 of the radar 103, a reception intensity of the reflected wave by the radar 103, and a position of the target detected by the radar 103. The detection target region R1 is, for example, an area having a radius of about 100 km around the own ship.

The sonar 104 transmits the ultrasonic wave, receives the reflected wave of the transmitted ultrasonic wave from the target, and detects the target such as a fish school existing around the own ship on the basis of the received reflected wave. The sonar 104 periodically or irregularly transmits sonar detection information indicating a latest detection result to the navigation information device 101. The sonar detection information indicates, for example, a detection target region R2 of the sonar 104, a reception intensity of the reflected wave by the sonar 104, and a position of the target detected by the sonar 104. The detection target region R2 is, for example, an area having a radius of about 5 km around the own ship.

The navigation information device 101 controls to display a surrounding screen G1 indicating the surrounding situation of the own ship and a sonar screen G2 indicating the detection result by the sonar 104 on the monitor 102. More specifically, the navigation information device 101 controls to display a display screen GA including both the surrounding screen G1 and the sonar screen G2 on the monitor 102.

The navigation information device 101 may be provided with the monitor 102.

The navigation information device 101 includes processing circuitry 10, an input receiving module 14, a storage module 15, and a mark setting module 16. The processing circuitry 10 includes a sonar information generating module 11, a surrounding information generating module 12, and a display control module 13. The storage module 15 is, for example, a non-volatile memory.

The sonar information generating module 11 receives the sonar detection information transmitted from the sonar 104, and generates sonar information for displaying the sonar screen G2 including a sonar echo S indicating a detection result by the sonar 104 based on the received latest sonar detection information. Then, the sonar information generating module 11 outputs the generated sonar information to the surrounding information generating module 12 and the display control module 13.

The surrounding information generating module 12 reads, for example, chart information relating to a chart from the external device 105 and generates chart information for displaying a chart screen periodically or irregularly based on the read chart information. The chart information includes, for example, landforms serving as landmarks for navigation, place names, symbols, etc.

The external device 105 may be configured to update the chart information periodically or irregularly. In this case, the chart information may include time series changes such as tidal current and water quality.

The chart information may be stored in advance in the storage module 15. In this case, the surrounding information generating module 12 reads the chart information from the storage module 15. In this case, the navigation information system 201 may not include the external device 105.

The surrounding information generating module 12 receives radar detection information transmitted from the radar 103, and generates radar information for superimposing a radar echo L or the like showing the detection result by the radar 103 on a chart screen on the basis of the received latest radar detection information.

The surrounding information generating module 12 receives the sonar information outputted from the sonar information generating module 11. Then, the surrounding information generating module 12 generates, based on the chart information, the radar information and the sonar information, surrounding information for displaying the surrounding screen G1, which is a screen obtained, for example, by superimposing the radar echo L and the sonar echo S on the chart screen. Then, the surrounding information generating module 12 outputs the generated surrounding information to the display control module 13.

The display control module 13 performs control for displaying the display screen GA including both the surrounding screen G1 and the sonar screen G2 on the monitor 102 based on the surrounding information outputted from the surrounding information generating module 12 and the sonar information outputted from the sonar information generating module 11. More specifically, the display control module 13 generates display screen information for displaying the display screen GA based on the surrounding information and the sonar information, and outputs the generated display screen information to the monitor 102, thereby performing control for displaying the display screen GA on the monitor 102.

The display control module 13 generates the display screen information periodically or irregularly on the basis of the latest surrounding information received from the surrounding information generating module 12 and the latest sonar information received from the sonar information generating module 11, and updates the display screen GA displayed on the monitor 102.

Figure 2:
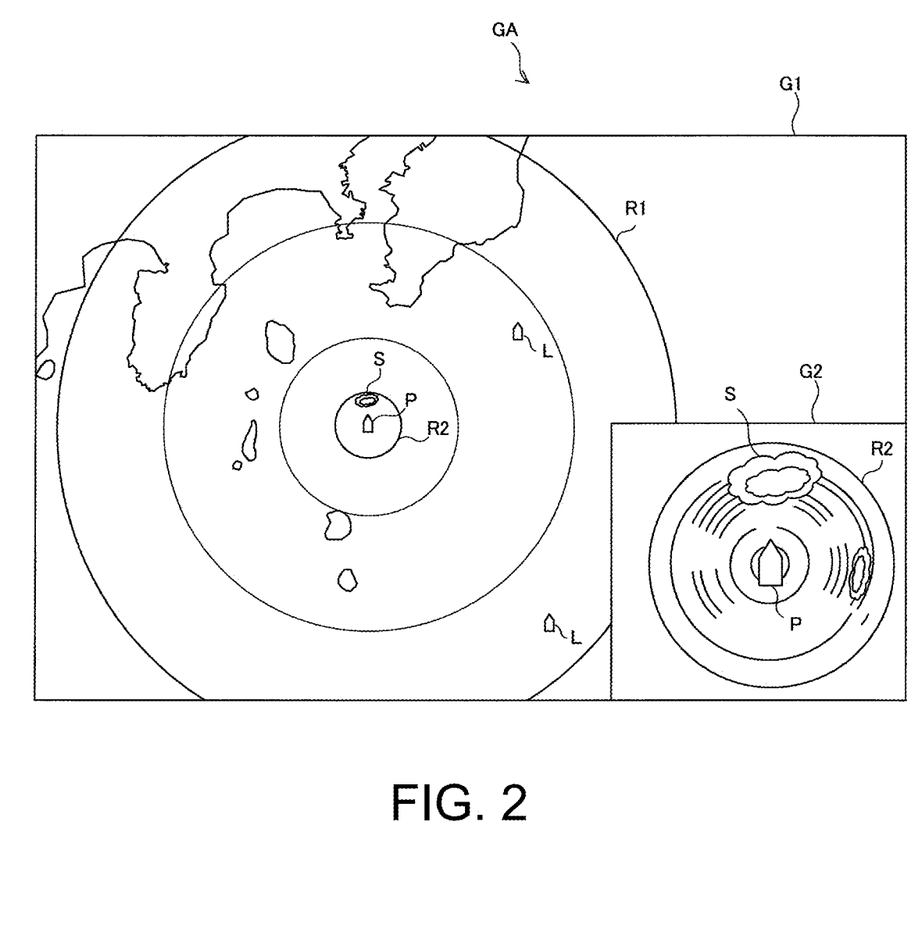
FIG. 2 shows an example of a display screen displayed by the navigation information device according to the embodiment of the present invention.

FIG. 2 shows an example of the display screen GA displayed by the navigation information device 101 according to the embodiment of the present invention.

Referring to FIG. 2, in the display screen GA, the display control module 13 makes either one display area of the surrounding screen G1 or the sonar screen G2 larger than the other display area. That is, the display control module 13 sets one of the surrounding screen G1 and the sonar screen G2 as a main screen and sets the other as a sub screen. The main screen and the sub screen have areas different from each other. For example, the area of the sub screen is less than half the area of the main screen.

When the surrounding screen G1 is set as the main screen and the sonar screen G2 is set as the sub screen, the display control module 13 displays the display screen GA so that, for example, the sonar screen G2 as the sub screen is superimposed on a part of the surrounding screen G1 as the main screen, as shown in FIG. 2.

When the surrounding screen G1 is set as the main screen and the sonar screen G2 is set as the sub screen, the display pattern of the display screen GA is referred to as "Pattern 1".

On the surrounding screen G1, for example, a symbol P indicating the position of the own ship, a circle indicating the detection target region R1 of the radar 103, the radar echo L indicating the target of another ship or the like detected by the radar 103, and the sonar echo S indicating the target of a fish school or the like, detected by the sonar 104 are superimposed on the chart screen. The sonar echo S is color-coded according to, for example, a level of the reception intensity of the reflected wave in the sonar 104.

The sonar screen G2 includes, for example, the symbol P indicating the position of the own ship, a circle indicating the detection target region R2 of the sonar 104, and the sonar echo S.

When a predetermined condition is satisfied, the display control module 13 switches a size relationship between the display areas of the surrounding screen G1 and the sonar screen G2 in the display screen GA. That is, when a predetermined condition is satisfied, the display control module 13 switches the settings of the main screen and the sub screen.

Figure 3:
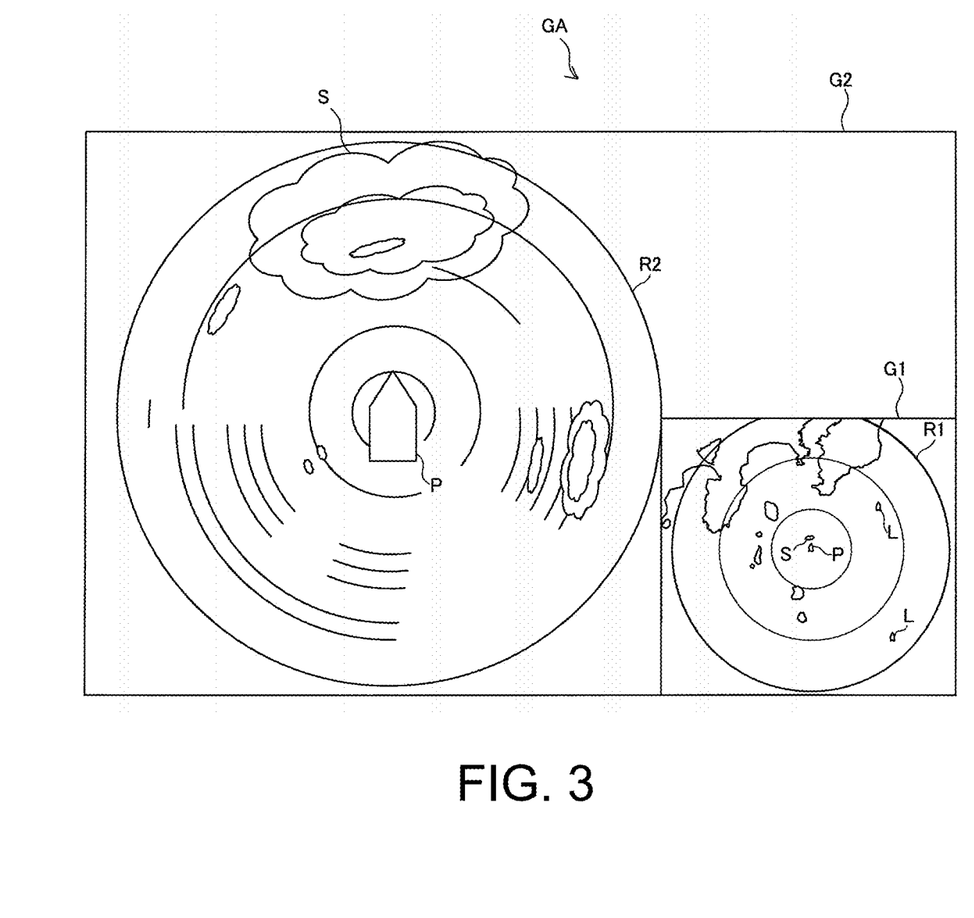
FIG. 3 shows an example of the display screen displayed by the navigation information device according to the embodiment of the present invention.
Figure 4:
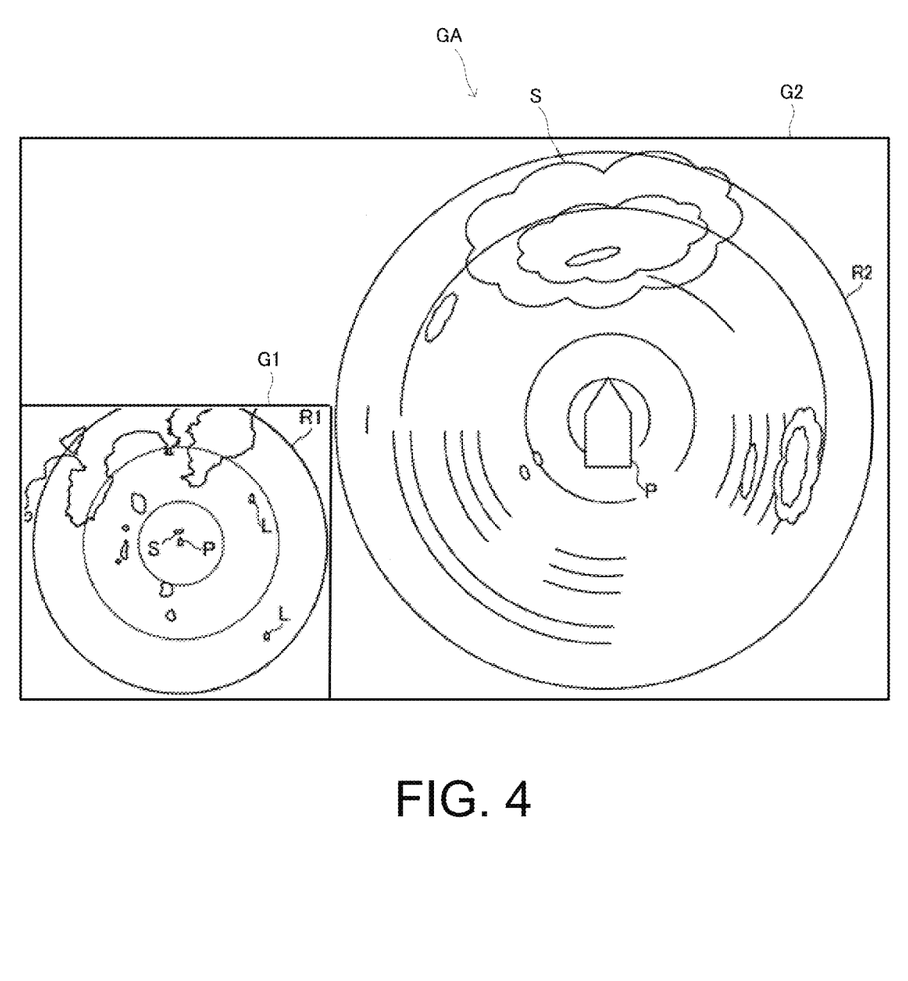
FIG. 4 shows an example of the display screen displayed by the navigation information device according to the embodiment of the present invention.

FIG. 3 and FIG. 4 show an example of the display screen GA displayed by the navigation information device 101 according to the embodiment of the present invention.

Referring to FIG. 2, FIG. 3, and FIG. 4, for example, as shown in FIG. 2, it is assumed that a predetermined condition is satisfied in a situation where the surrounding screen G1 is set as the main screen and the sonar screen G2 is set as the sub screen. In this case, the display control module 13 sets the sonar screen G2 as the main screen and sets the surrounding screen G1 as the sub screen.

Then, as shown in FIG. 3 or FIG. 4, the display control module 13 makes the display area of the sonar screen G2 larger than the display area of the surrounding screen G1 in the display screen GA. When the sonar screen G2 is set as the main screen and the surrounding screen G1 is set as the sub screen, the display pattern of the display screen GA is referred to as "Pattern 2".

When the display pattern is changed from "Pattern 1" shown in FIG. 2 to "Pattern 2" shown in FIG. 4, the sizes of the main screen and the sub screen may be gradually changed over a certain period of time.

When a predetermined condition is satisfied, an alarm display or an alarm sound may be generated.

The display pattern of the display screen GA first displayed on the monitor 102 may be either of the pattern 1 and the pattern 2.

The surrounding screen G1 may not include the sonar echo S. In this case, the sonar information generating module 11 outputs the sonar information to the display control module 13 but does not output it to the surrounding information generating module 12. Then, the surrounding information generating module 12 generates the surrounding information for displaying the surrounding screen G1 which is a screen obtained by superimposing the radar echo L on a chart screen based on the chart information and the radar information.

The surrounding screen G1 may not include the radar echo L. In this case, the navigation information system 201 may not include the radar 103.

The surrounding screen G1 may be equivalent to a nautical chart screen containing neither the radar echo L nor the sonar echo S. In this case, the navigation information system 201 may not include the radar 103.

The surrounding screen G1 may be the radar echo L containing neither the chart screen nor the sonar echo S. In this case, the navigation information system 201 may not include the external device 105.

Referring again to FIG. 1, when a user performs an operation to add a mark M as a mark for navigation of the own ship to the display screen GA using a mouse or the like (not shown), the input receiving module 14 outputs operation information indicating the operation contents to the mark setting module 16.

Upon receiving the operation information output from the input receiving module 14, the mark setting module 16 stores mark information relating to the mark M to be displayed on the display screen GA in the storage module 15 based on the operation information and the chart information stored in the external device 105. The mark information includes, for example, latitude and longitude, place name, current, water quality, etc., of a position where the mark M is added.

When an operation for adding the mark M to either one of the surrounding screen G1 and the sonar screen G2 is performed, the display control module 13 performs control for adding the mark M to both the surrounding screen G1 and the sonar screen G2.

More specifically, when generating the surrounding information, the surrounding information generating module 12 confirms whether or not the mark information indicating the latitude and longitude of the position included in the detection target region R1 of the radar 103 is stored in the storage module 15.

When one or more mark information indicating the latitude and longitude of the position included in the detection target region R1 are stored in the storage module 15, the surrounding information generating module 12 generates the surrounding information for displaying the surrounding screen G1 in which one or more marks M corresponding to the one or more mark information are superimposed on the chart screen. Then, the surrounding information generating module 12 outputs the generated surrounding information to the display control module 13.

The sonar information generating module 11 confirms whether or not mark information showing latitude and longitude of a position included in the detection target region R2 of the sonar 104 is stored in the storage module 15 while generating the sonar information.

Then, the sonar information generating module 11 generates the sonar information for displaying the sonar screen G2 in which one or a plurality of marks M respectively corresponding to the one or a plurality of mark information are superimposed on the sonar screen G2 when one or a plurality of mark information indicating the latitude and longitude of the position included in the detection target region R2 is stored in the storage module 15. The sonar information generating module 11 outputs the generated sonar information to the display control module 13.

As described above, the display control module 13 controls to display the display screen GA including both the surrounding screen G1 and the sonar screen G2 on the monitor 102 based on the surrounding information from the surrounding information generating module 12 and the sonar information from the sonar information generating module 11.

Figure 5:
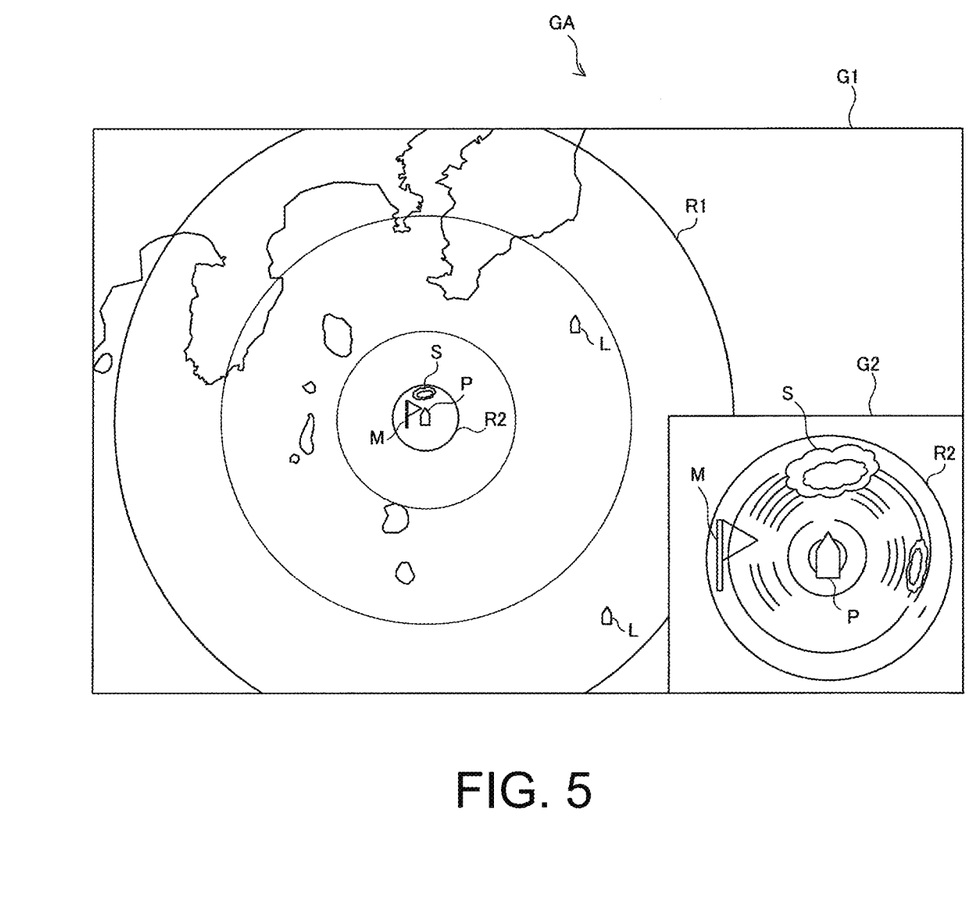
FIG. 5 shows an example of the display screen on which marks are superimposed, displayed by the navigation information device according to the embodiment of the present invention.

FIG. 5 shows an example of the display screen GA on which marks are superimposed, which is displayed by the navigation information device 101 according to the embodiment of the present invention.

Referring to FIG. 5, for example, it is assumed that the user performs an operation of adding the mark M included in the detection target region R2 of the sonar 104 on the surrounding screen G1. In this case, the display control module 13 displays the display screen GA in which a mark M is added to both the surrounding screen G1 and the sonar screen G2.

Referring again to FIG. 1, when a predetermined operation is performed on the displayed sonar screen G2, the display control module 13 adds the mark M to the surrounding screen G1 at a position corresponding to the detection target region R2 of the sonar 104. Specifically, it is assumed that the user performs an operation for storing the displayed sonar screen G2. In this case, the display control module 13 adds the mark M to the surrounding screen G1 at a position corresponding to the detection target region R2 included in the sonar screen G2.

Figure 6:
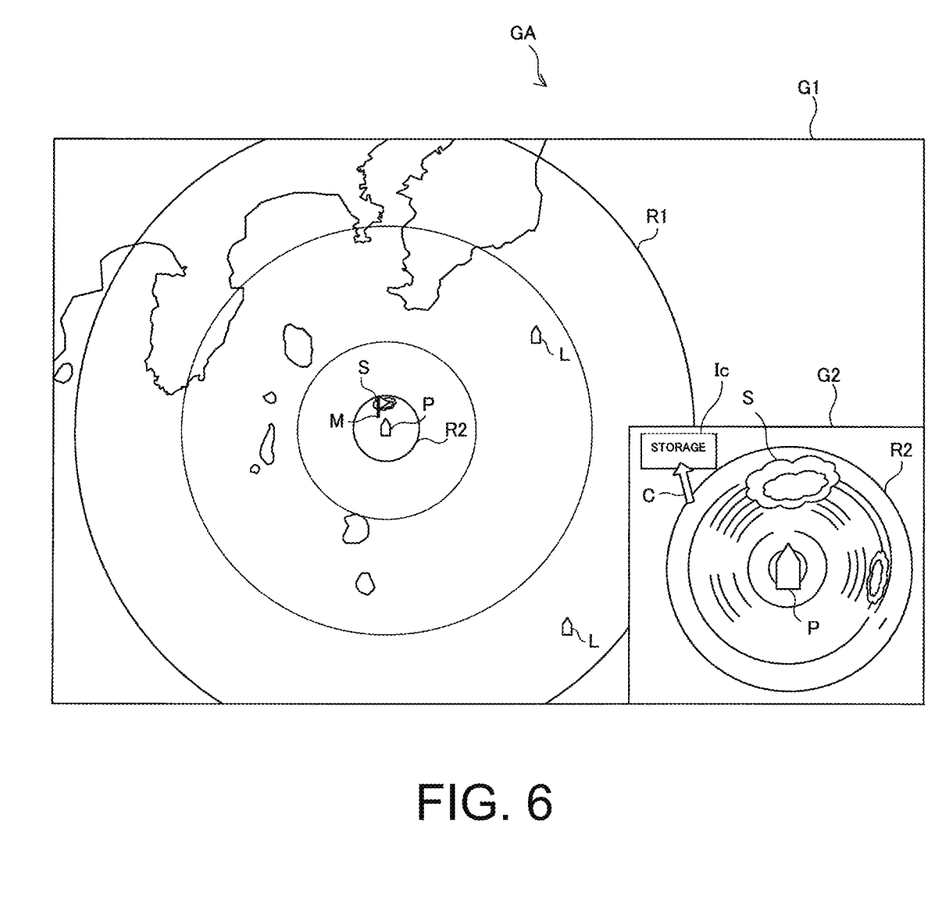
FIG. 6 shows an example of the display screen on which marks are superimposed, displayed by the navigation information device according to the embodiment of the present invention.

FIG. 6 shows an example of the display screen GA on which marks are superimposed, which is displayed by the navigation information device 101 according to the embodiment of the present invention.

Referring to FIG. 1 and FIG. 6, it is assumed that the sonar screen G2 includes a storage icon Ic for instructing the storage of the sonar screen G2. Then, it is assumed that the user moves a cursor C to the storage icon Ic on the displayed sonar screen G2 and performs an operation for instructing the storage of the sonar screen G2.

In this case, the input receiving module 14 outputs operation information for instructing the storage of the sonar screen G2 to the mark setting module 16.

When the mark setting module 16 receives the operation information for instructing the storage of the sonar screen G2 from the input receiving module 14, for example, the mark setting module 16 reads the chart information stored in the external device 105, and stores the mark information including the latitude/longitude, the place name, the current, the water quality, etc., of the position corresponding to the current detection target region R2 of the sonar 104 in the storage module 15.

The surrounding information generating module 12 generates surrounding information based on the mark information stored in the storage module 15, and outputs the surrounding information to the display control module 13.

The display control module 13 receives surrounding information from the surrounding information generating module 12 and displays the display screen GA including the surrounding screen G1 on which the mark M is superimposed on the chart screen based on the surrounding information.

Further, the display control module 13 controls to display information on the selected mark M when an operation to select the mark M displayed on the surrounding screen G1 or the sonar screen G2 is performed.

Figure 7:
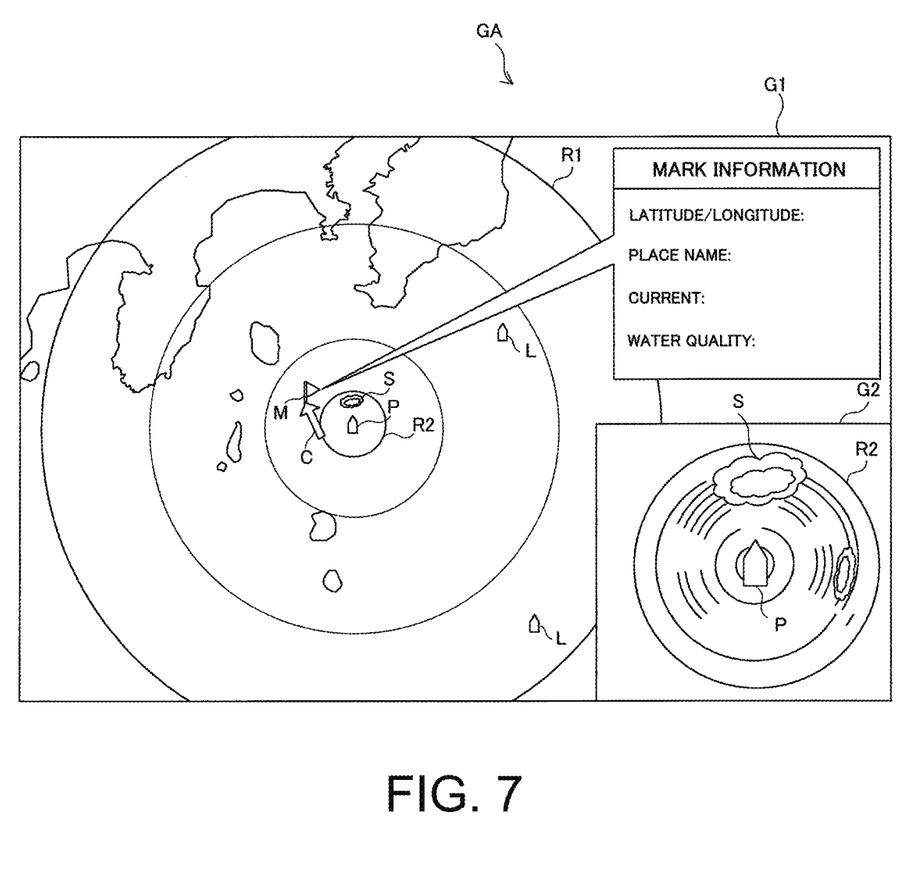
FIG. 7 shows an example of the display screen including information about marks displayed by the navigation information device according to the embodiment of the present invention.

FIG. 7 shows an example of the display screen GA including information on marks displayed by the navigation information device 101 according to the embodiment of the present invention.

Specifically, with reference to FIG. 1 and FIG. 7, it is assumed that the user moves the cursor C to the mark M displayed on the display screen GA to select the mark M. In this case, the input receiving module 14 outputs operation information indicating the operation contents by the user to the display control module 13.

When receiving operation information indicating the mark M selected by the user from the input receiving module 14, the display control module 13 reads the mark information corresponding to the mark M from the storage module 15, and displays the display screen GA including the content of the mark information on the basis of the read mark information.

Referring again to FIG. 1 to FIG. 3, as described above, the display control module 13 switches the display pattern of the display screen GA when a predetermined condition is satisfied. For example, when a target such as a school of fish is detected by the sonar 104, the display control module 13 makes the display area of the sonar screen G2 larger than the display area of the surrounding screen G1 in the display screen GA.

Specifically, when the reception intensity of the reflected wave indicated by the sonar detection information received from the sonar 104 is equal to or greater than a threshold value, the sonar information generating module 11 generates target detection information indicating that the target is detected in the detection target region R2. The sonar information generating module 11 outputs the target detection information to the display control module 13 in addition to the sonar information for displaying the sonar screen G2.

When receiving the target detection information output from the sonar information generating module 11, the display control module 13 determines that the first predetermined condition is satisfied. When the display screen GA of the pattern 1 shown in FIG. 2 is displayed, the display control module 13 switches the display pattern of the display screen GA to the pattern 2 shown in FIG. 3 or FIG. 4.

For example, when the distance between the own ship and the position designated on the chart screen is less than a threshold Th1, the display control module 13 makes the display area of the sonar screen G2 larger than the display area of the surrounding screen G1 on the display screen GA.

The position designated on the display screen GA is, for example, a position where the mark M is added by the user.

Specifically, when generating the sonar information, the sonar information generating module 11 confirms whether or not the mark information relating to the mark M included in the range where the distance from the own ship is less than the threshold Th1 is stored in the storage module 15.

Then, when the mark information relating to the mark M included in the range where the distance from the own ship is less than the threshold Th1 is stored in the storage module 15, the sonar information generating module 11 generates, for example, mark detection information indicating that the mark M is included in the range. The sonar information generating module 11 outputs the generated mark detection information to the display control module 13 in addition to the sonar information.

When receiving the mark detection information output from the sonar information generating module 11, the display control module 13 determines that the first predetermined condition is satisfied. When the display screen GA of the pattern 1 is displayed, the display control module 13 switches the display pattern of the display screen GA to the pattern 2.

For example, when the sonar echo S displayed on the surrounding screen G1 is selected in the display screen GA, the display control module 13 makes the display area of the sonar screen G2 larger than the display area of the surrounding screen G1.

Specifically, when the display screen GA of the pattern 1 is displayed, the user moves the cursor C to the sonar echo S included in the surrounding screen G1 to select the sonar echo S. In this case, the input receiving module 14 outputs operation information indicating the operation contents by the user to the display control module 13.

When the display control module 13 receives operation information indicating that the sonar echo S included in the surrounding screen G1 is selected from the input receiving module 14, it determines that the first predetermined condition is satisfied and switches the display pattern of the display screen GA from the pattern 1 to the pattern 2.

For example, when the distance between the other ship or the shore and the own ship is less than a threshold Th2, the display control module 13 makes the display area of the sonar screen G2 smaller than the display area of the surrounding screen G1 in the display screen GA.

Specifically, when a target of the other ship or the shore is detected by the radar 103, more specifically, when the reception intensity of the reflected wave indicated by the radar detection information received from the radar 103 is equal to or greater than a threshold, the surrounding information generating module 12 generates target detection information indicating that the target is detected in the detection target region R1. Then, the surrounding information generating module 12 outputs the generated target detection information to the display control module 13.

When receiving the target detection information output from the surrounding information generating module 12, the display control module 13 determines that the second predetermined condition is satisfied. When the display screen GA of the pattern 2 is displayed, the display control module 13 switches the display pattern of the display screen GA to the pattern 1.

The navigation information device 101 includes a computer including a memory, and an arithmetic processing module such as a CPU in the computer reads a program including a part or the whole of each step of the following flowchart from the memory and executes it. The program of the navigation information device 101 can be installed from the outside. The program of the navigation information device 101 is distributed in a state stored in a recording medium.

Figure 8:
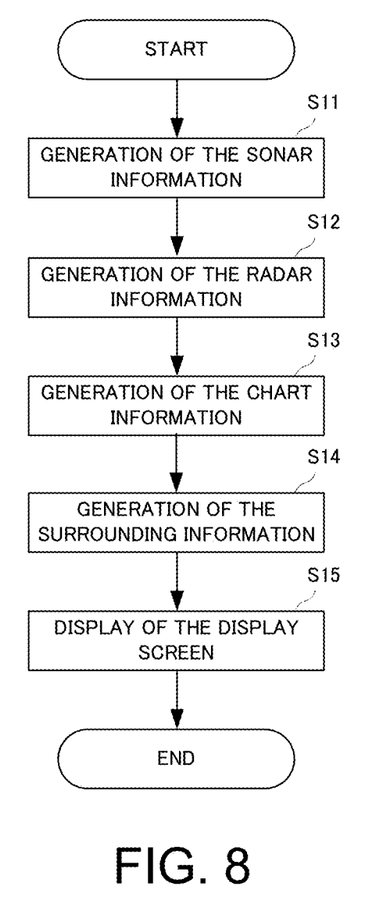
FIG. 8 shows a flow of operations for displaying the display screen by the navigation information device according to the embodiment of the present invention.

FIG. 8 shows a flow of operations for displaying the display screen GA by the navigation information device 101 according to the embodiment of the present invention.

Referring to FIG. 8, first, the sonar information generating module 11 receives the sonar detection information transmitted from the sonar 104, and generates the sonar information based on the sonar detection information. Then, the sonar information generating module 11 outputs the sonar information to the surrounding information generating module 12 and the display control module 13 (S11).

Next, the surrounding information generating module 12 receives the radar detection information transmitted from the radar 103, and generates the radar information based on the radar detection information (S12).

Next, the surrounding information generating module 12 generates chart information based on the chart information stored in the storage module 15 (S13).

Next, the surrounding information generating module 12 generates surrounding information for displaying the surrounding screen G1 based on the sonar information, the radar information, and the chart information. Then, the surrounding information generating module 12 outputs the surrounding information to the display control module 13 (S14).

Next, the display control module 13 generates the display screen information for displaying the display screen GA including the surrounding screen G1 and the sonar screen G2 on the basis of the surrounding information from the surrounding information generating module 12 and the sonar information from the sonar information generating module 11. The display control module 13 transmits the display screen information to the monitor 102, thereby performing control for displaying the display screen GA on the monitor 102 (S15).

Note that the generation of the sonar information by the sonar information generating module 11 (S11), the generation of the radar information by the surrounding information generating module 12 (S12), and the generation of the chart information by the surrounding information generating module 12 (S13) may be performed in any order. The operations from S11 to S15 are performed periodically or irregularly.

When generating sonar information (S11), the sonar information generating module 11 generates the sonar information on the basis of the sonar detection information and the mark information when the mark information on the mark M included in the detection target region R2 of the sonar 104 is stored in the storage module 15.

When generating the surrounding information (S14), the surrounding information generating module 12 generates the surrounding information based on the sonar information, the radar information, the chart information, and the mark information when the mark information related to the mark M included in the detection target region R1 of the radar 103 is stored in the storage module 15.

Figure 9:
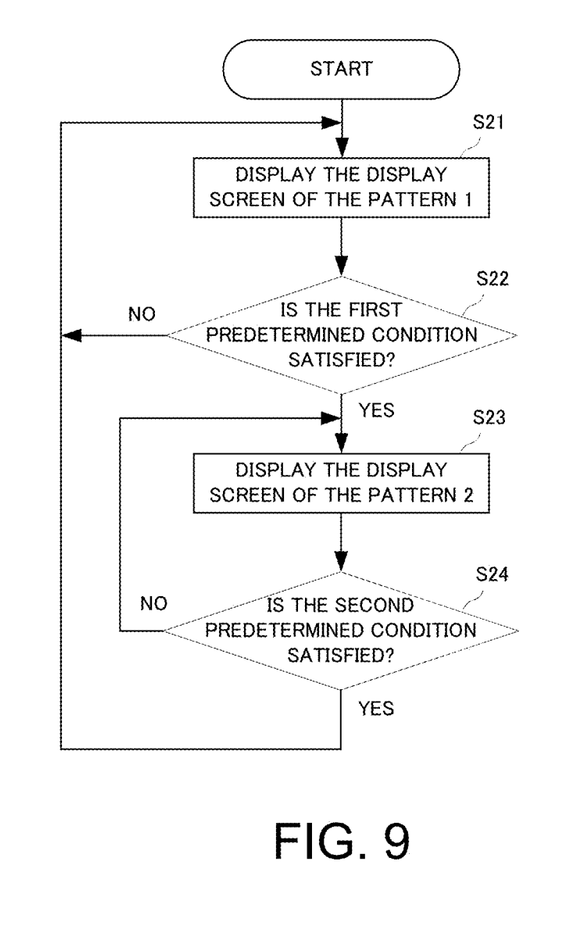
FIG. 9 shows a flow of operations when the navigation information device according to the embodiment of the present invention switches the display pattern of the display screen.

FIG. 9 shows the flow of operations when the navigation information device 101 according to the embodiment of the present invention switches the display pattern of the display screen GA.

Referring to FIG. 9, first, the display control module 13 performs control to display, for example, the display screen GA of the pattern 1 (S21).

Next, the display control module 13 confirms whether or not the first predetermined condition is satisfied. Specifically, the display control module 13 confirms whether or not at least one of the target detection information from the sonar information generating module 11, the mark detection information from the sonar information generating module 11, and the operation information from the input receiving module 14 indicating that the sonar echo S is selected on the surrounding screen G1 is received (S22).

Next, when receiving at least one of the target detection information, the mark detection information, and the operation information, the display control module 13 determines that the first predetermined condition is satisfied (In S22, "YES"). The display control module 13 switches the display pattern of the display screen GA from the pattern 1 to the pattern 2. That is, the display control module 13 controls to display the display screen GA of the pattern 2 (S23).

Next, the display control module 13 confirms whether or not the second predetermined condition is satisfied. Specifically, the display control module 13 confirms whether or not target detection information is received from the surrounding information generating module 12 (S24).

Next, when receiving the target detection information, the display control module 13 determines that the second predetermined condition is satisfied (In S24, "YES"), and switches the display pattern of the display screen GA from the pattern 1 to the pattern 2. That is, the display control module 13 controls to display the display screen GA of the pattern 1 (S21).

On the other hand, in a state where the display screen GA of the pattern 1 is displayed, the display control module 13 determines that the first predetermined condition is not satisfied until at least one of target detection information and mark detection information from the sonar information generating module 11 and operation information indicating that the sonar echo S is selected in the surrounding screen G1 is received (In S22, "NO"), and continues to display the display screen GA of the pattern 1 (S21).

Further, in the state where the display screen GA of the pattern 2 is displayed, until receiving the target detection information from the surrounding information generating module 12, the display control module 13 determines that the second predetermined condition is not satisfied (In S24, "NO"), and continues to display the display screen GA of the pattern 2 (S23).

The above embodiments should be considered illustrative in all respects and not restrictive. The scope of the invention is indicated by the claims, not by the above description, and is intended to include all modifications within the meaning and scope of the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise noted, numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A navigation information device, comprising:
processing circuitry configured to:
generate surrounding information about a surrounding of an own ship;
generate sonar information indicating a detection result by a sonar; and
when a predetermined condition is satisfied:
enlarge a first display area of a surrounding screen on which the surrounding information is displayed or a sonar screen on which the sonar information is displayed as compared to the first display area before the predetermined condition is satisfied; and
reduce a second display area of the other of the surrounding screen or the sonar screen as compared to the second display area before the predetermined condition is satisfied.

2. The navigation information device of claim 1, wherein:
the processing circuitry generates chart information or radar information, as the surrounding information.

3. The navigation information device of claim 1, wherein:
the processing circuitry generates information in which two or more of: chart information, radar information, and the sonar information are superimposed, as the surrounding information.

4. The navigation information device of claim 3, wherein:
the first display area is of the surrounding screen,
the second display area is of the sonar screen, and
when a sonar echo superimposed on the surrounding screen is selected, the processing circuitry is further configured to enlarge the second display area of the sonar screen and to reduce the first display area of the surrounding screen as compared with the corresponding display areas before the sonar echo is selected.

5. The navigation information device of claim 1, wherein:
the first display area is of the surrounding screen,
the second display area is of the sonar screen, and
when a target is detected by the sonar, the processing circuitry is further configured to enlarge the second display area of the sonar screen and to reduce the first display area of the surrounding screen as compared with the corresponding display areas before the target is detected.

6. The navigation information device of claim 1, wherein:
the first display area is of the surrounding screen,
the second display area is of the sonar screen, and
when a distance between the own ship and a position designated on the surrounding screen is less than a threshold value, the processing circuitry is further configured to enlarge the second display area of the sonar screen and to reduce the first display area of the surrounding screen as compared with the corresponding display areas before the distance becomes less than the threshold value.

7. The navigation information device of claim 1, wherein:
the first display area is of the surrounding screen,
the second display area is of the sonar screen, and
when a distance between another ship or shore and the own ship is less than a threshold value, the processing circuitry is further configured to reduce the second display area of the sonar screen and to enlarge the first display area of the surrounding screen as compared with the corresponding display areas before the distance becomes less than the threshold value.

8. The navigation information device of claim 1, wherein:
when an operation for adding a mark to either one of the surrounding screen and the sonar screen is performed, the processing circuitry is further configured to add the mark to both the surrounding screen and the sonar screen.

9. The navigation information device of claim 1, wherein:
when a predetermined operation is performed on the sonar screen, the processing circuitry is further configured to add a mark at a position corresponding to a detection target region of the sonar on the surrounding screen.

10. The navigation information device of claim 1, wherein:
when an operation to select a mark displayed on the surrounding screen or the sonar screen is performed, the processing circuitry is further configured to display information about the mark.

11. The navigation information device of claim 1, wherein:
when the predetermined condition is satisfied, the processing circuitry is further configured to gradually enlarge the first display area over a certain period of time and to gradually reduce the second display area over the certain period of time as compared with the corresponding display areas before the predetermined condition is satisfied.

12. The navigation information device of claim 1, wherein:
when the predetermined condition is satisfied, the processing circuitry is further configured to display an alarm display or to generate an alarm sound.

13. A navigation information processing method, comprising:
generating surrounding information about a surrounding of an own ship;
generating sonar information indicating a detection result by a sonar; and
when a predetermined condition is satisfied:
enlarging a first display area of a surrounding screen on which the surrounding information is displayed or a sonar screen on which the sonar information is displayed as compared to the first display area before the predetermined condition is satisfied; and
reducing a second display area of the other of the surrounding screen or the sonar screen as compared to the second display area before the predetermined condition is satisfied.

14. The method of claim 13, further comprising generating chart information or radar information, as the surrounding information.

15. The method of claim 13, wherein further comprising generating information in which two or more of: chart information, radar information, and the sonar information are superimposed, as the surrounding information.

16. The method of claim 15, wherein the first display area is of the surrounding screen, and the second display area is of the sonar screen, the method further comprising:
when a sonar echo superimposed on the surrounding screen is selected, enlarging the second display area of the sonar screen and reducing the first display area of the surrounding screen as compared with the corresponding display areas before the sonar echo is selected.

17. The method of claim 15, wherein the first display area is of the surrounding screen, and the second display area is of the sonar screen, the method further comprising:
when a target is detected by the sonar, enlarging the second display area of the sonar screen and reducing the first display area of the surrounding screen as compared with the corresponding display areas before the sonar echo is selected.

18. The method of claim 13, wherein the first display area is of the surrounding screen, and the second display area is of the sonar screen, the method further comprising:

when a distance between the own ship and a position designated on the surrounding screen is less than a threshold value, enlarging the second display area of the sonar screen and reducing the first display area of the surrounding screen as compared with the corresponding display areas before the distance becomes less than the threshold value.

19. The method of claim 13, wherein the first display area is of the surrounding screen, and the second display area is of the sonar screen, the method further comprising:

when a distance between another ship or shore and the own ship is less than a threshold value, reducing the second display area of the sonar screen and enlarging the first display area of the surrounding screen as compared with the corresponding display areas before the distance becomes less than the threshold value.

20. The method of claim 13, further comprising:

when an operation for adding a mark to either one of the surrounding screen and the sonar screen is performed, adding the mark to both the surrounding screen and the sonar screen.

* * * * *